United States Patent Office 3,641,102
Patented Feb. 8, 1972

3,641,102
CATALYTIC PROCESS FOR THE AMMONOXYDATION OF OLEFINS
Philippe Reulet, Morenx, and Alain Pfister, Jacques Tellier, and Jean-Henry Blanc, Pau, France, and Kirsten Borre Jorgensen, Holte, and Hans Bohlbro, Lingby, Denmark, assignors to Société Nationale des Petroles d'Aquitaine Tour Aquitaine, Courbevoie, France
No Drawing. Filed Mar. 4, 1969, Ser. No. 804,286
Claims priority, application France, Mar. 5, 1968, 142,447
Int. Cl. C07c 121/02
U.S. Cl. 260—465.3                                 10 Claims

ABSTRACT OF THE DISCLOSURE

The known method of preparing olefinic nitriles by oxidizing a gaseous mixture of olefin with ammonia, over a catalyst containing Mo and Te oxides, has been improved by selecting a catalytically active material which consists of a combination of 1 mole $MoO_3$ with 10 to 0.1 moles $TeO_3$ and 0.1 to 1 mole $Fe_2O_3$, and preferably with 0.35 to 0.14 mole $TeO_3$ and 0.14 to 0.2 mole $Fe_2O_3$. The improved method is particularly suitable for the production of acrylonitrile by the ammonoxidation of propylene, and allows one to reach yields of more than 70% with respect to the olefin used, when the temperature, normally of 300° to 600° C., is kept within the narrower limits of 380° to 450°, the duration of contact between reacting gases and catalyst is 3 to 10 seconds, and the gaseous mixture contains by volume 1 to 15% of propylene, 1 to 15% of ammonia and 2 to 14% of oxygen, the balance being nitrogen and/or steam.

---

The invention relates to the production of nitriles of olefins by oxidizing olefins in the presence of ammonia; it more especially relates to the production of acrylonitrile. The main object of the invention is a new catalyst employed to realize these productions.

The oxidation of olefins in the presence of ammonia, and especially that of propylene, has been the subject of numerous prior studies. Among the catalysts used, some are based on phosphomolybdates of various metals such as tellurium, bismuth, etc. The present invention makes it feasible to realize this operation with a selectivity better than that which was achieved with the processes of prior art.

The process according to the invention consists in having a gaseous mixture of olefin, ammonia, oxygen and eventually inert gases, pass through a catalytic mass, the active material of which contains $MoO_3$, $TeO_3$ and $FeO_3$, eventually combined partially or totally as iron telluromolybdate or iron and tellurium telluromolybdate.

The catalyst composition according to the invention can be represented by the formula

$$tTeO_3, mMoO_3, fFeO_3 \qquad (1)$$

in which $m/t$ can vary from 0.1 to 10 and preferably from 4 to 7, $m/f$ being comprised between 1 and 10 and preferably from 5 to 7.

Like other similar catalysts, the active material according to the invention is employed on a porous substrate known per se, such as, for instance, kaolin, alumina, silica and, above all, silica obtained from an aqueous sol. The weight proportion of this substrate is generally comprised between 25 and 75% of the total catalytic mass, and preferably between 40 and 60%.

The catalyst according to the invention can be obtained conveniently from a mixture of oxides of the three metals, Mo, Te and Fe taken in adequate proportion.

A particular preparation of the catalyst according to the invention consists in starting from iron telluromolybdate or iron and tellurium telluromolybdate prepared prior to incorporating this material with the substrate, the latter being preferably in the hydrated state especially in the form of an aqueous sol.

A preferred process, which is within the scope of the invention, consists in adding, to a silica hydrosol containing 5 to 10% of $SiO_2$, the required quantity of iron telluromolybdate, telluromolybdic acid and telluric acid, or of telluromolybdic acid, and iron compound and then telluric acid; the liquid thus obtained is dried at about 120° C. for the necessary time to transform it into a porous solid, the duration of this operation being generally about 24 hours; the porous mass is then calcined between 400° and 500° C. during 24 hours; the preferred calcination temperature is 450° C.

The olefin ammonoxidation reaction is generally carried out in condition known per se. Thus, the proportions of olefin, oxygen and ammonia, in the mixture passing through the catalyst, can be chosen within a broad range. The proportion of olefin is preferably comprised between 1 and 15% by volume, that of ammonia varies preferably from 1 to 15% by volume, the proportion of oxygen is between 2 and 14% by volume, the balance being constituted by one or several inert gases. The molecular oxygen can be either pure oxygen or oxygen diluted with an inert gas such as nitrogen and/or steam. One can conveniently use air, a mixture of air and oxygen, or a mixture of air and a diluting inert gas.

Controlling the oxygen proportion at a set value lower than 15% by volume of the gaseous mixture is important for the safety of the operation, that means for avoiding explosions. On the other hand, it is particularly advantageous to use a mixture containing 5 to 25% steam.

As in similar processes, the reaction of oxygen and ammonia with olefin is effected between 300° and 600° C., and preferably between 380° and 450° C. The contact time with the catalyst can widely vary according to the selected temperature; this time is generally comprised between 0.15 and 15 seconds, and preferably of 3 to 10 seconds.

Non limitative examples are given hereafter, to illustrate the invention.

EXAMPLES 1–2

A catalyst is prepared by mixing an aqueous solution of iron telluromolybdate with an aqueous sol of silica, subsequently drying the mixture at 120° C. during 24 hours and then calcining at 450° C. during 24 hours.

On a dry basis, the mixture used for the preparation of the catalyst contains, by weight:

50% of heteropolyanionic salt $Fe_2(TeMo_6O_{24})$, and
50% of $SiO_2$ as support material.

The testing of activity is made in a tube having 12 mm. in diameter containing 10 ml. of a catalyst, maintained at 400° C. A mixture of propylene, ammonia, oxygen and steam is passed through this charge of catalyst, the volumetric ratio $O_2/C_3'H_6$ being 1.5 and $C_3H_6/NH_3$ being equal to 1; the partial pressure of the steam in the mixture is 0.125 atmosphere.

At the outlet of the catalyst tube, the acrylonitrile, acrolein and acetonitrile resulting from the reaction are measured; the effluent gases also contain carbon oxide and carbon dioxide.

The results are shown in the following table.

| Example number | 1 | 2 |
|---|---|---|
| Contact time, seconds | 3 | 6 |
| Propylene conversion, percent | 42 | 52 |
| Selectivity, percent as: | | |
| Acrylonitrile | 79 | 84 |
| Acrolein | 4 | 4 |
| Acetonitrile | 3 | 0 |

EXAMPLES 3-4

An iron telluromolybdate catalyst is prepared as in Examples 1 and 2, except that some telluric acid is added. The proportions by weight, on a dry basis, are:

Active compound:
25% of iron telluromolybdate $Fe(TeMoO_{24})$, and
25% of telluric acid ($H_6TeO_6$)
Substrate material:
50% $SiO_2$ The active compound thus contains, for one mole of $MoO_3$, 1.03 mole of $TeO_3$ and 0.166 mole of $Fe_2O_3$, which corresponds to the ratios $m/t=0.97$ and $m/f=6$, in the above Formula 1.

The test conditions being the same as in the previous examples, operation were conducted with contact times of 3 and 6 seconds respectively.

The results thus obtained are shown in the following table.

| Example number | 3 | 4 |
|---|---|---|
| Contact time, seconds | 3 | 6 |
| Propylene conversion, percent | 28.5 | 46 |
| Selectivity, percent as: | | |
| Acrylonitrile | 69 | 81 |
| Acrolein | 6 | 5 |
| Acetonitrile | 4 | 2.5 |

EXAMPLES 5-6

These examples show how conversion and selectivity can be increased, for the catalyst employed in Examples 1 and 2 by adjusting operating conditions.

The following table gives the results of the test made with the iron telluromolybdate catalyst, prepared according to Examples 1 and 2.

The temperature is 400° C. and the contact times are respectively 6 and 2 seconds.

The reacting gaseous mixture passing through the catalyst has the following composition:

| | Percent by volume |
|---|---|
| $C_3H_6$ | 6 |
| $NH_3$ | 6 |
| $O_2$ | 12 |
| $H_2O$ | 12.5 |
| $N_2$ | 63.5 |

| Example number | 5 | 6 |
|---|---|---|
| Contact time, seconds | 6 | 8 |
| Propylene conversion, percent | 71 | 77 |
| Selectivity, percent as: | | |
| Acrylonitrile | 86 | 86 |
| Acetonitrile | 4 | 3.5 |
| Acrylonitrile yield, percent | 61 | 66 |

EXAMPLE 7

The catalyst is prepared as in Examples 1 and 2, but it is used in the form of 4 x 4 mm. cylindrical pellets. The test is carried out in a tube having a diameter of 20 mm., containing 160 ml. of catalyst maintained at 415° C. through the catalyst, a mixture of propylene, ammonia, oxygen and steam is passed, in which the volumetric ratios are: $O_2/C_3H_6=2$ and $NH_3/C_3H_6=1$. In the mixture, the partial pressure of propylene is 0.06 atm. and that of steam 0.10 atm. The contact time is 6 seconds. After 500 hours of continuous operation, one obtains a propylene conversion equal to 81.5% and the selectives:

| | Percent |
|---|---|
| As acrylonitrile | 88 |
| As acetonitrile | 0.5 |
| As acrolein | 1 | the remainder consisting of carbon oxides. Thus, the yield in acrylontrile is 71.5%. These results are better than those obtained in Examples 1 and 2; it thus appears that the pellet form of the catalyst is more advantageous.

EXAMPLE 8

The catalyst has the same overall formula as in Examples 1 and 2, but it is prepared in starting from tellurium and molybdenum oxides instead of telluromolybdate. Its preparation consists in adding to a silica sol "Ludox" the required quantities of molybdenum and tellurium oxides and some iron or nitrate. The liquid thus obtained is dried at 120° C., during 24 hours, then calcined at about 450° C. during 24 hours.

The test is made in a tube of 12 mm. in diameter, containing 10 ml. of catalyst, kept at 412° C. The conditions are near to the ones of the Example 7; the gas used shows the ratios:

$$O_2/C_3H_6=2$$
$$NH_3/C_3H_6=1$$

In the mixture, the propylene partial pressure is 0.06 atm. and the steam partial pressure is 0.125 atm. The contact time is 6 seconds.

After 150 hours of continuous operation, the conversion of propylene equals 88% with an acrylonitrile selectivity of 78.5%; which means a yield in acrylonitrile equal to 69%.

EXAMPLES 9-14

In these examples, the catalyst contained the molybdenum, iron and tellurium oxides, and varying proportions of the latter; with the purpose of testing the influence of the content in tellurium of the catalyst composition.

The preparation method was similar to the one of Example 8. One added to a silica sol containing 5 to 10% of $SiO_2$, the required amount of molybdic acid, telluric acid and iron nitrate. In Example 13, the molybdenum was introduced as silico-molybdic acid

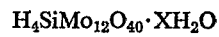

$$H_4SiMo_{12}O_{40} \cdot XH_2O$$

In all the examples the mixture was dried and calcined as above described. The calcined catalysts contained 50% by weight of $SiO_2$, except in Example 13, in which the silica content was 44%. The remainder was composed of:

Examples—
9: $6MoO_3 \cdot Fe_2O_3 \cdot$ (no tellurium present).
10: $6MoO_3 \cdot Fe_2O_3 \cdot 0.080TeO_3$
11: $6MoO_3 \cdot Fe_2O_3 \cdot 1.00TeO_3$
12: $6MoO_3 \cdot Fe_2O_3 \cdot 1.15TeO_3$
13: $6MoO_3 \cdot Fe_2O_3 \cdot 1.00TeO_3$
14: $6MoO_3 \cdot Fe_2O_3 \cdot 2.00TeO_3$ Testing conditions of the catalysts were the same as in Example 8; the results obtained after 150 hours of continuous operation are shown in the following table:

| Example No. | Te in the catalyst | Propylene conversion | Acrylonitrile selectivity | Acrylonitrile yield | Acrylonitrile plus acrolein yield |
|---|---|---|---|---|---|
| 9 | 0 | 58 | 30 | 17.5 | 17.5 |
| 10 | 4.3 | 76.5 | 82 | 63 | 63 |
| 11 | 5.3 | 78 | 88.5 | 69 | 70 |
| 12 | 5.95 | 86 | 80.5 | 69 | 72 |
| 13 | 5.95 | 86 | 82 | 70.5 | 72 |
| 14 | 9.3 | 79.5 | 75.5 | 60 | 63 |

We claim:

1. A process for producing acrylonitrile which comprises reacting, at a temperature of 300° to 600° C., a gaseous mixture of propylene, ammonia and oxygen in the presence of a catalyst consisting essentially of a combination of $m$ moles of molybdenum trioxide, $t$ moles of tellerium trioxide and $f$ moles of ferric oxide wherein $m/t$ is 0.1 to 10 and $m/f$ is 1 to 10.

2. The process of claim 1 wherein $m/t$ is 4 to 7 and $m/f$ is 5 to 7.

3. The process of claim 2 wherein the catalyst is supported on a silica substrate.

4. The process of claim 3 wherein the substrate is 25-75 weight percent of the total catalytic mass.

5. The process of claim 4 wherein the catalyst is prepared by mixing an aqueous solution of iron telluromolybdate with a silica hydrosol, drying the mixture to obtain a porous solid and thereafter calcinating the porous solid at a temperature of 400-500° C.

6. The process of claim 5 wherein the gaseous mixture contains 1 to 15 volume percent propylene, 1 to 15 volume percent ammonia, 2 to 14 volume percent oxygen and the balance being inert gas; and wherein the gaseous mixture is contacted with the catalyst for 0.15 to 15 seconds at a temperature of 380-450° C.

7. The process of claim 4 wherein the catalyst is prepared by mixing molybdenum trioxide, tellerium trioxide and ferric oxide with a silica hydrosol, drying the mixture to obtain a porous solid and thereafter calcinating the porous solid at a temperature between 400-500° C.

8. The process of claim 7 wherein the gaseous mixture contains 1 to 15 volume percent propylene, 1 to 15 volume percent ammonia, 2 to 14 volume percent oxygen and the balance being inert gas; and wherein the gaseous mixture is contacted with the catalyst for 0.15 to 15 seconds at a temperature of 380-450° C.

9. The process of claim 2 wherein the gaseous mixture contains 1 to 15 volume percent propylene, 1 to 15 volume percent ammonia, 2 to 14 volume percent oxygen, the balance being nitrogen and steam; and wherein the gaseous mixture is contacted with the catalyst for 0.15 to 15 seconds at a temperature of 380-450° C.

10. The process of claim 8 wherein the catalyst is supported on 40-60 weight percent silica based on the total weight of the catalytic mass, and wherein the gaseous mixture is contacted with the catalyst for 3 to 10 seconds.

References Cited

UNITED STATES PATENTS 3,142,697  7/1964  Jennings et al. ____ 260—465.3
3,392,189  7/1968  Eden _____ 260—465.3

JOSEPH P. BRUST, Primary Examiner

U.S. Cl. X.R.

252—439; 260—604 R

UNITED STATES PATENT OFFICE
CERTIFICATE OF CORRECTION

Patent No. 3,641,102  Dated February 8, 1972

Inventor(s) Philippe Reulet et al

It is certified that error appears in the above-identified patent and that said Letters Patent are hereby corrected as shown below:

Column 2, line 58, for "$C_3'H_6$" read -- $C_3H_6$ --.
Column 3, line 60, for "through" read -- Through --; line 66, for "selectives" read -- selectivities --.
Column 4, line 7, after "iron" read -- oxide --.
Column 6, line 9, for "8" read -- 9 --

Signed and sealed this 27th day of June 1972.

(SEAL)
Attest:

EDWARD M. FLETCHER, JR.
Attesting Officer

ROBERT GOTTSCHALK
Commissioner of Patents